(12) United States Patent
Fladhammer (10) Patent No.: US 11,585,416 B2
(45) Date of Patent: Feb. 21, 2023

(54) FINE PITCH ADJUSTER

(71) Applicant: Asyst Technologies L.L.C., Kenosha, WI (US)

(72) Inventor: Scott T. Fladhammer, Caledonia, WI (US)

(73) Assignee: Asyst Technologies L.L.C., Kenosha, WI (US)

( * ) Notice: Subject to any disclaimer, the term of this patent is extended or adjusted under 35 U.S.C. 154(b) by 0 days.

(21) Appl. No.: 17/664,515

(22) Filed: May 23, 2022

(65) Prior Publication Data

US 2022/0381324 A1 Dec. 1, 2022

Related U.S. Application Data (60) Provisional application No. 63/202,212, filed on Jun. 1, 2021.

(51) Int. Cl.
*F16H 25/20* (2006.01)
*F16D 7/02* (2006.01)
*B60Q 1/068* (2006.01)

(52) U.S. Cl.
CPC .......... *F16H 25/2021* (2013.01); *F16D 7/021* (2013.01); *B60Q 1/0683* (2013.01); *F16H 2025/209* (2013.01); *F16H 2025/2046* (2013.01)

(58) Field of Classification Search
CPC .......... F16H 25/2021; F16H 2025/209; F16H 2025/2046; B60Q 1/0683; F16D 7/021
See application file for complete search history.

(56) References Cited

U.S. PATENT DOCUMENTS

| | | | |
|---|---|---|---|
| 2,069,433 | A | 2/1937 | Wildhaber |
| 4,075,870 | A | 2/1978 | Seifried |
| 4,703,399 | A | 10/1987 | Van Duyn et al. |
| 4,796,494 | A | 1/1989 | Eckenrode et al. |
| 4,896,562 | A * | 1/1990 | Wilkinson ............. G05G 11/00 475/3 |

(Continued)

FOREIGN PATENT DOCUMENTS

EP 0472784 3/1992

OTHER PUBLICATIONS

The extended European Search Report issued for European Patent Application No. 22175871.7 dated Oct. 24, 2022.

*Primary Examiner* — David M Fenstermacher
(74) *Attorney, Agent, or Firm* — James A. Joyce; Godfrey & Kahn, S.C.

(57) ABSTRACT

A fine pitch adjuster that includes a housing, a wheel gear positioned within the housing and coupled to a ball stud, wherein rotation of the wheel gear provides inward and outward longitudinal translation of the ball stud relative to the housing, and a clutching worm input drive including, an inner drive sleeve having a shaft portion and a head portion, the shaft portion including a plurality of sleeve slots formed therein and a plurality of engagement ribs, and an outer worm gear sleeve having worm gear threads, the worm gear threads coupled at least indirectly to the wheel gear, and an inner chamber, the outer worm gear sleeve including a plurality of grooves extending longitudinally along the inner chamber for mating engagement with the plurality of engagement ribs, wherein rotation of the inner drive sleeve provides clutchable engagement with the outer worm gear sleeve to rotate the wheel gear.

17 Claims, 6 Drawing Sheets

(56) References Cited

U.S. PATENT DOCUMENTS

| | | | |
|---|---|---|---|
| 5,214,971 A | 6/1993 | Burton et al. | |
| 5,483,426 A | 1/1996 | Lewis et al. | |
| 5,707,133 A | 1/1998 | Burton | |
| 6,257,747 B1 | 7/2001 | Burton | |
| 6,568,837 B2 | 5/2003 | Denley | |
| 6,773,153 B2 | 8/2004 | Burton | |
| 6,810,985 B1 * | 11/2004 | Budaker | F16H 13/02 |
| | | | 74/424.81 |
| 7,118,259 B2 | 10/2006 | Fladhammer | |
| 7,354,183 B2 | 4/2008 | Burton | |
| 7,762,686 B2 | 7/2010 | Fladhammer | |
| 9,074,659 B2 * | 7/2015 | Wu | F16H 1/125 |
| 10,023,101 B2 | 7/2018 | Burton | |
| 10,907,712 B2 * | 2/2021 | Bastide | F16H 25/2454 |
| 2004/0093969 A1 * | 5/2004 | Nielsen | F16H 25/20 |
| | | | 74/89.23 |
| 2005/0160846 A1 * | 7/2005 | Chiang | H02K 7/06 |
| | | | 74/89.35 |
| 2010/0139429 A1 * | 6/2010 | Ku | F16H 25/2454 |
| | | | 74/89.37 |
| 2010/0213310 A1 | 8/2010 | Flatt | |
| 2021/0348673 A1 | 11/2021 | Ma | |
| 2022/0268323 A1 * | 8/2022 | Bartus | F16D 11/14 |

\* cited by examiner

FINE PITCH ADJUSTER

CROSS-REFERENCE TO RELATED APPLICATIONS

This application claims the benefit of and priority to U.S. Provisional Patent Application No. 63/202,212 filed on Jun. 1, 2021, the disclosure of which is incorporated herein by reference in its entirety for all purposes.

FIELD OF THE INVENTION

The invention relates generally to adjusters and more particularly to vehicle headlamp adjusters.

BACKGROUND OF THE INVENTION

Vehicles such as automobiles typically have several lamps that can be fixed in a housing supporting a reflector and a lens which are often securely fit into mounting brackets attached to the vehicle. Together, a lamp (or lamps) and a mounting bracket form a complete lamp assembly. Once the lamp assembly has been manufactured and installed into a vehicle, the lamp must be adjusted to the proper aim. Typically, the adjustment is in both the vertical and horizontal directions although, depending on the type of lamp and applicable regulations, adjustment in only one direction may be required.

One method of adjusting the aim of the lamp involves using an adjuster. The adjuster can be formed as part of the mounting bracket, part of the housing, or can be a separate part between the housing and the mounting bracket (or the reflector directly if no separate mounting bracket is used). One known type of adjuster includes a housing and an ball stud extending therefrom. The ball stud is engaged to the reflector directly or to a mounting bracket on which the reflector is positioned. Actuation or operation of the adjuster causes the ball stud to move. Such movement causes the mounting bracket and/or reflector to pivot or otherwise move with respect to the housing, thereby adjusting the aim of the lamp. One example of this type of adjuster is disclosed in U.S. Pat. No. 6,773,153 to Burton, the disclosure of which is incorporated herein by reference for all purposes. The housing of the adjuster in this Burton design has an opening and a gear positioned inside the housing. The gear is functionally engaged to a ball stud. An input shaft is positioned in the opening and interacts with the gear. Actuation of the input shaft results in rotation of the gear and engaged ball stud. The gear translates actuation of the input shaft into axial movement of the ball stud and its ball stud end. Numerous variations exist on this general concept.

Various automotive headlight and headlight assembly designs use LED and/or high intensity discharge (HID) light sources for primary illumination. The importance of proper aiming of these very bright vehicle headlights to avoid glare that can blind oncoming drivers is known. As optimal nighttime visibility with minimal impact of glare is the main purpose for headlights, the proper aiming of headlights will be of increased importance to the automotive market. Generally, headlight aiming is performed by the manufacturer of the vehicle during assembly using desired criteria. Typical headlamp adjusters have low gear ratios that provide a faster, albeit coarse, adjustment. These adjusters allow for quick adjustment during assembly, but unfortunately these coarse adjustments do not allow for a high degree of fine adjustment, as one might desire with a precise and bright light source, such as provided by LEDs.

Although various right angle headlamp adjusters are known, such as disclosed in U.S. Pat. Nos. 7,354,183; 5,707,133; and U.S. Pat. No. 5,214,971 to Burton et al., which are incorporated by reference, as well as U.S. Pat. No. 5,483,426 to Lewis et al., U.S. Pat. No. 4,796,494 to Eckenrode et al., and U.S. Pat. No. 4,703,399 to Van Duyn et al., these mechanisms only provide a coarse adjustment resulting in a relatively large linear movement of an associated ball stud component.

BRIEF SUMMARY OF THE INVENTION

In at least some embodiments, the invention relates to a fine pitch adjuster that includes: a housing; a wheel gear positioned within the housing and coupled to a ball stud, wherein rotation of the wheel gear provides inward and outward longitudinal translation of the ball stud relative to the housing; and a clutching worm input drive including: an inner drive sleeve having a shaft portion and a head portion, the shaft portion including a plurality of sleeve slots formed therein and a plurality of engagement ribs extending longitudinally and radially therefrom; and an outer worm gear sleeve rotationally mounted at least partially in the housing and having worm gear threads extending radially therefrom, the worm gear threads coupled at least indirectly to the wheel gear, and an inner chamber for receiving the shaft portion therein, the outer worm gear sleeve including a plurality of grooves extending longitudinally along the inner chamber for mating engagement with the plurality of engagement ribs, wherein rotation of the inner drive sleeve provides clutchable engagement with the outer worm gear sleeve to rotate the wheel gear.

In at least some other embodiments, the invention relates to a clutching worm input drive that includes: an inner drive sleeve having a shaft portion and a head portion, the shaft portion including a plurality of sleeve slots formed therein and a plurality of engagement ribs extending longitudinally and radially therefrom; and an outer worm gear sleeve having worm gear threads extending radially therefrom and coupled at least indirectly to the wheel gear, and an inner chamber for receiving the shaft portion therein, the outer worm gear sleeve including a plurality of grooves extending longitudinally along the inner chamber for mating engagement with the engagement ribs Other embodiments, aspects, and features of the invention will be understood and appreciated upon a full reading of the detailed description and the claims that follow.

BRIEF DESCRIPTION OF THE DRAWINGS

Embodiments of the invention are disclosed with reference to the accompanying drawings and are for illustrative purposes only. The invention is not limited in its application to the details of construction or the arrangement of the components illustrated in the drawings. The invention is capable of other embodiments or of being practiced or carried out in other various ways. In the drawings.

DETAILED DESCRIPTION

Figure 1:
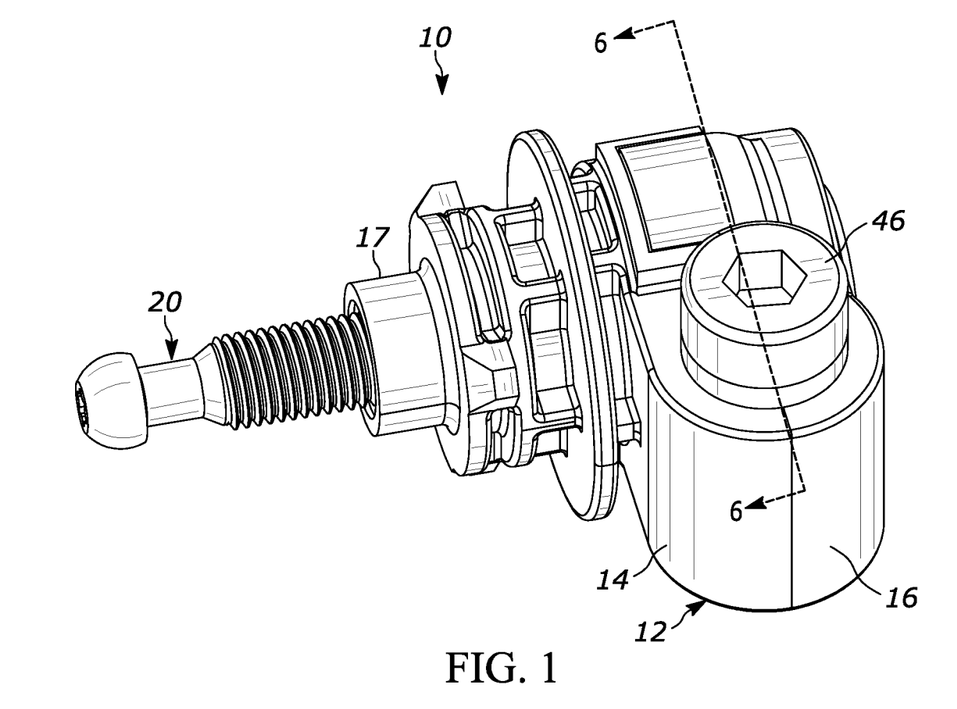
FIG. 1 is a top perspective view of an exemplary fine pitch adjuster.
Figure 2:
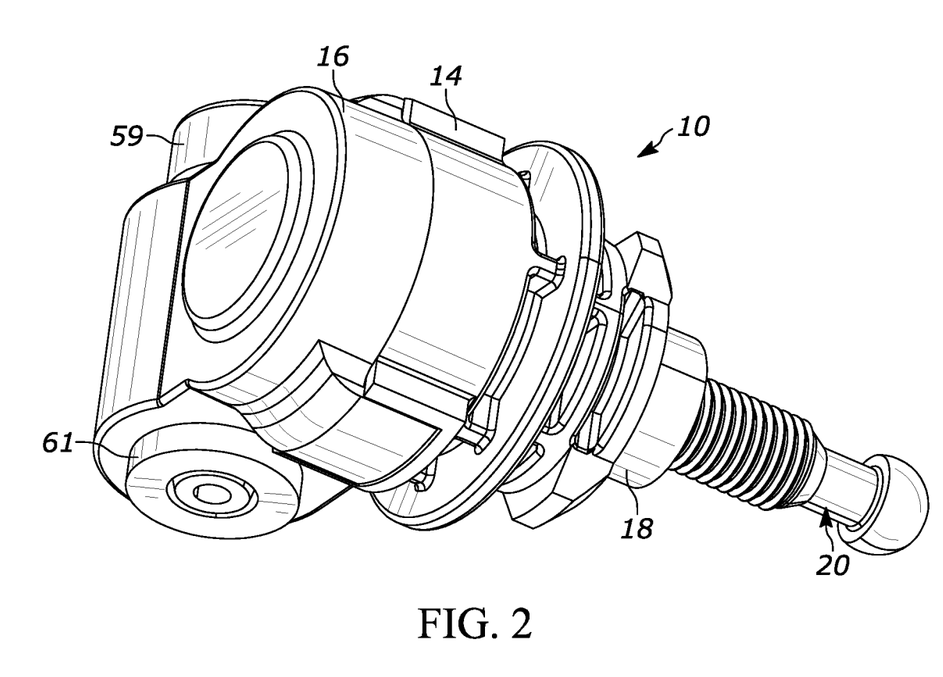
FIG. 2 is a bottom perspective view of the adjuster of FIG. 1.
Figure 3:
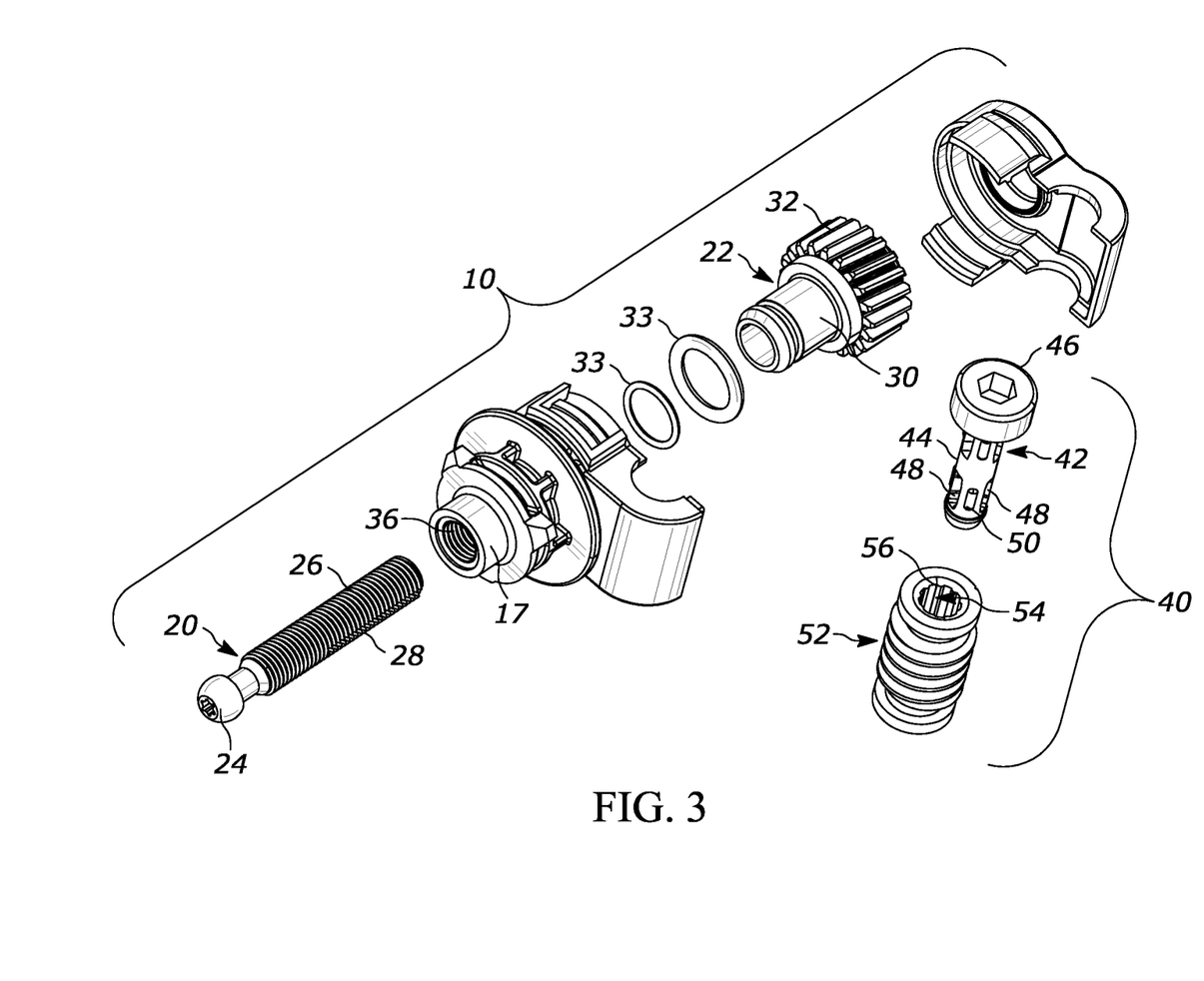
FIG. 3 is a front exploded view of the adjuster of FIG. 1.
Figure 4:
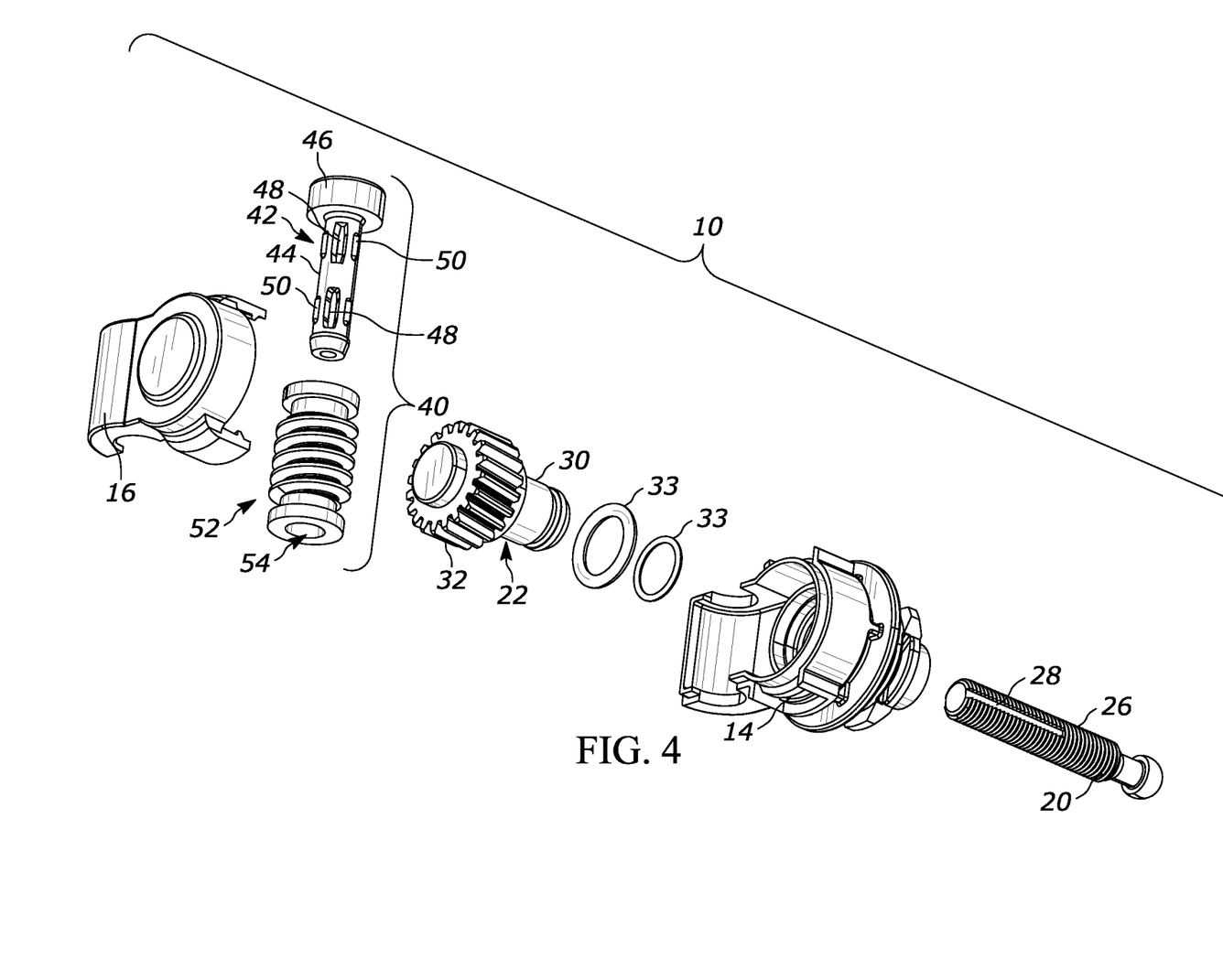
FIG. 4 is a rear exploded view of the adjuster of FIG. 1.

Referring to FIGS. 1 and 2, an exemplary fine pitch adjuster 10 is shown in front and rear perspective views. The fine pitch adjuster 10 is used in vehicle applications to allow for fine aiming adjustments of vehicle lamps and lamp assemblies. The fine pitch adjuster 10 includes a housing 12, which in at least some embodiments, can be a multi-part housing including a front portion 14 securable to a rear portion 16, with the front portion 14 including a nose 17. Further referring to FIGS. 3 and 4 providing exploded front and rear perspective views of the fine pitch adjuster 10, the housing 12 a least partially encloses a ball stud 20 coupled with a helical ball stud wheel gear 22. The ball stud 20 includes a ball head 24 and threaded section 26, in at least some embodiments, the threaded section further including a pair of longitudinal guide slots 28 on opposite sides of the threaded section 26.

Figure 6:
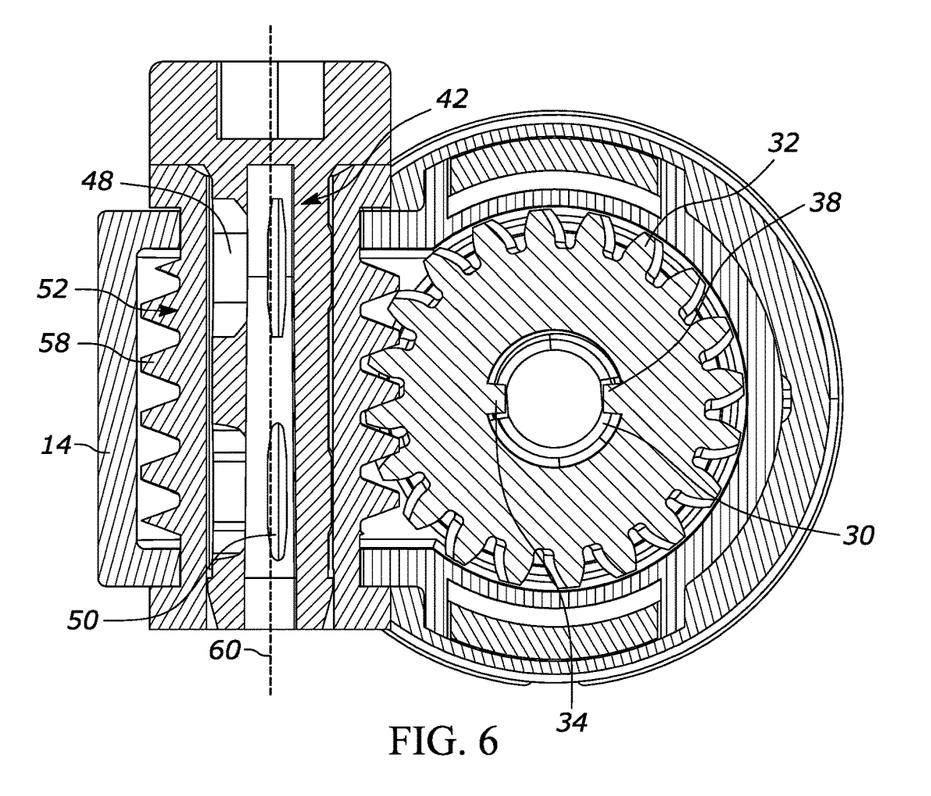
FIG. 6 is cross-sectional rear view of the adjuster taken along line 6-6 of FIG. 1.

The ball stud wheel gear 22 includes a cylindrical body 30 with beveled ball stud gear teeth 32 extending radially therearound a portion thereof and a pair of internal guide ribs 34 (see FIG. 6). One or more O-rings 33 can be provided around the body 30 to provide sealing. The threaded section 26 of the ball stud 22 is threadingly engaged with threads 36 in the nose 17, and the guide slots 28 are slidingly engaged with the guide ribs 34. When the ball stud wheel gear 22 is rotated within the housing 12 the ball stud 20 is also rotated via the engagement of the guide slots 28 with the guide ribs 34 and translates into or out of the nose 17 via the threaded engagement causing the ball head 24 to be less or more linearly displaced from the housing 12, this displacement results in movement of the coupled vehicle lamps or lamp assemblies to provide an alignment adjustment.

Figure 5:
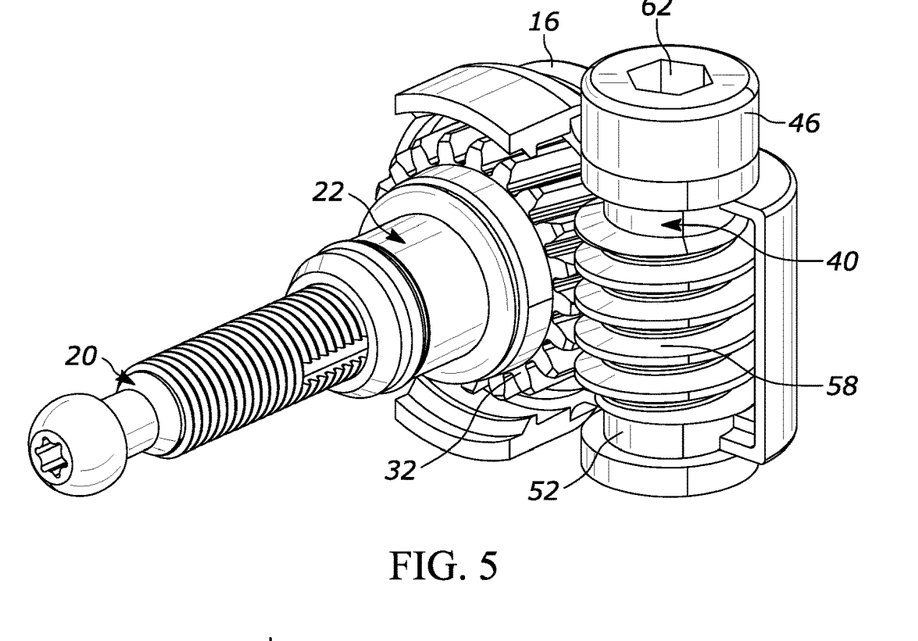
FIG. 5 is a front perspective view of the adjuster of FIG. 1 with a front portion of the housing removed.
Figure 7:
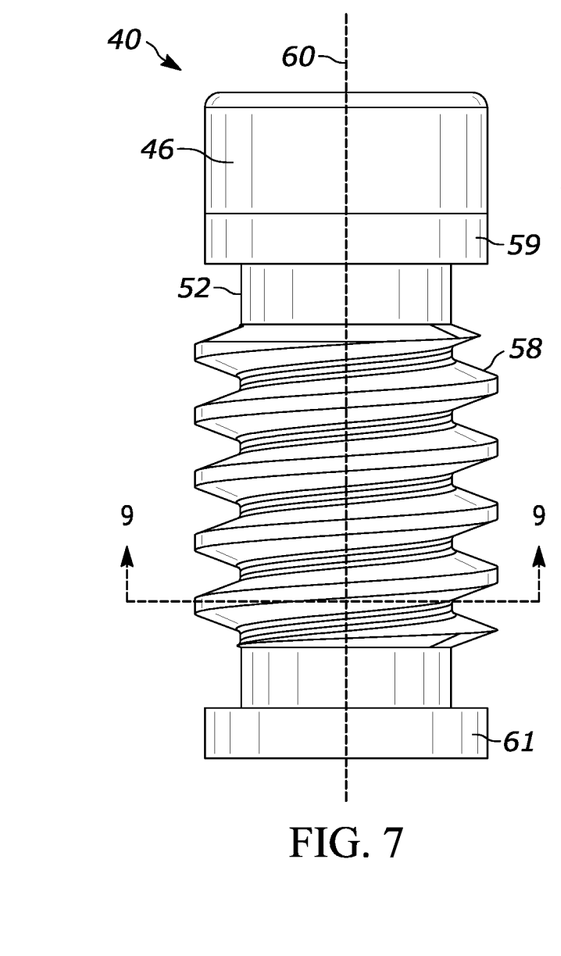
FIG. 7 is a side view of the worm input drive of the adjuster of FIG. 1.
Figure 8:
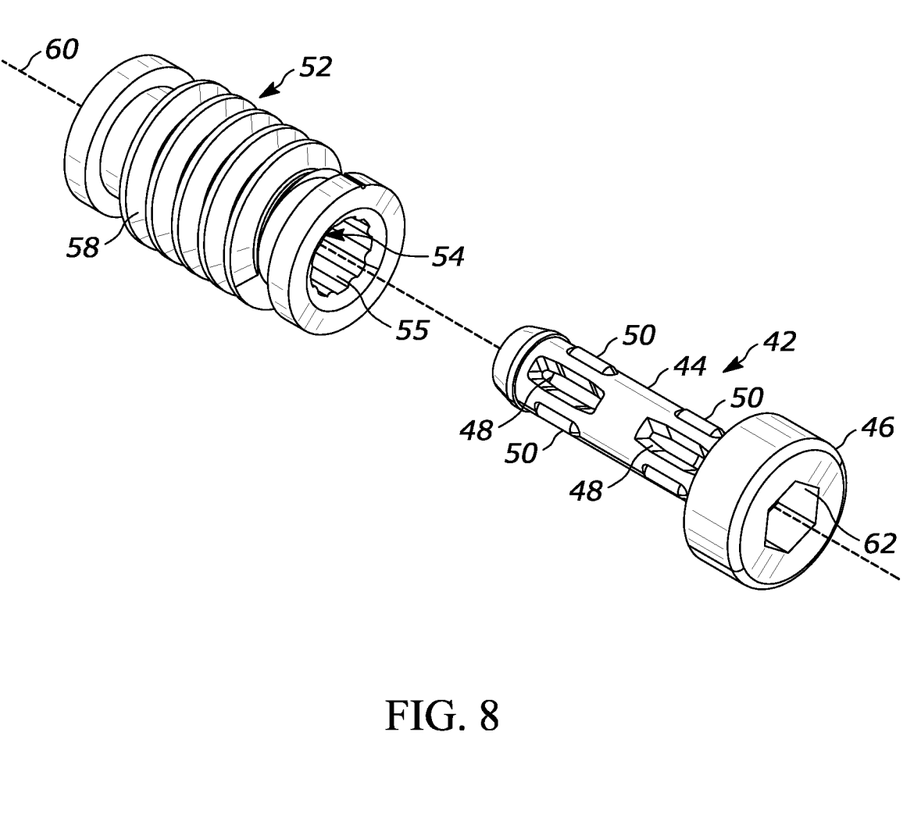
FIG. 8 is an exploded view of the worm input drive of FIG. 7.
Figure 9:
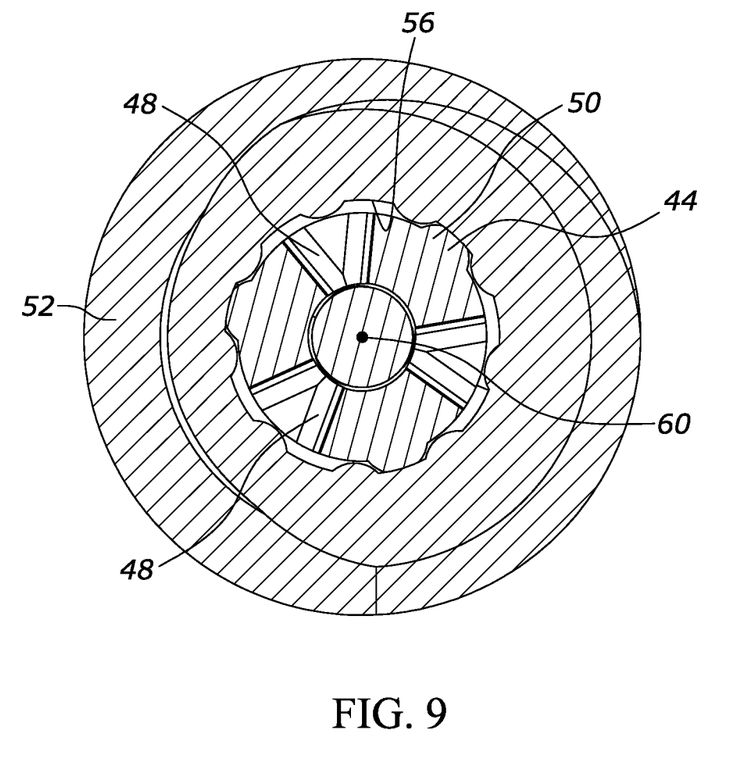
FIG. 9 is a cross-sectional view of the worm input drive taken along line 9-9 of FIG. 7.

Referring generally to FIGS. 1-4, as well as FIGS. 5-7, an exemplary worm input drive 40 is shown, which in at least some embodiments, is rotationally mounted at least partially in the housing 12. In at least some embodiments, the worm input drive 40 includes an inner drive sleeve 42 having a shaft portion 44 and a head portion 46, the shaft portion 44 including a plurality of sleeve slots 48 formed therein and a plurality of engagement ribs 50 extending radially therefrom and longitudinally along the shaft portion 44. The worm input drive 40 further including an outer worm gear sleeve 52 having an inner chamber 54 for receiving the shaft portion 44 of the inner drive sleeve 42 therein. The outer worm gear sleeve 52 also includes a plurality of engagement grooves 56 extending longitudinally along the inner chamber 54 for mating engagement with the engagement ribs 50. The outer worm gear sleeve 52 further includes worm gear threads 58 extending radially therefrom. The worm gear threads 58 are sized and shaped to matingly engage with the ball stud gear teeth 32 such that rotation of the outer worm gear sleeve 52 around a worm input drive central longitudinal axis 60 causes rotation of the ball stud wheel gear 22 and effectively longitudinal translation of the ball stud 20. The size and pitch of the worm gear threads 58 can be selected to provide the desired level of rotation to the ball stud wheel gear 22 and resultant translation of the ball stud 20. The worm gear threads 58 can be configured to engage any of numerous gear configurations found in various types of adjuster configurations. In at least some embodiments, the outer worm gear sleeve 52 further includes a top flange portion 59 and a bottom flange portion 61, wherein the top flange portion 59 and the bottom flange portion 61 are situated outside of the housing 12 to rotatably secure the outer worm gear sleeve 52 in position. In at least some embodiments, the top flange portion 59 and/or bottom flange portion 61 is cylindrical having a flat bottom.

The head portion 46 of the inner drive sleeve 42 can include a tool engaging portion 62, such as a hex depression or protrusion, configured to engage a tool, such as a hex driver, for selectively rotating the inner drive sleeve 42. Rotation of the inner drive sleeve 42 causes the outer worm gear sleeve 52 to rotate due to the engagement of the engagement ribs 50 with the engagement grooves 56. As such, due to the various aforementioned engagements, rotation of the head portion 46 in a first direction causes the ball stud 20 to translate longitudinally (linearly) into the nose 17, and rotation of the head portion 46 in a second direction causes the ball stud 20 to translate longitudinally out of the nose 17.

The use of worm gear threads 58, as opposed to a bevel gear (which would need to be prohibitively large), allows for a notable reduction in ball stud wheel gear 22 rotation relative to the rotation of the head portion 46 (high gear ratio), while allowing the adjuster 10 to maintain a compact size. For example, in at least some embodiments, a 360-degree rotation of the head portion 46 provides a ball stud linear translation of about 0.05 millimeters relative to the housing 12, while in other embodiments, more or less translation can be provided. In addition, as the worm gear threads 58 of the worm input drive 40 tend to provide a self-locking engagement with the beveled ball stud gear teeth 32, the aiming adjustment can be maintained even when subject to vibrations, without requiring a prohibitively high adjustment torque.

The positive rotational engagement between the inner drive sleeve 42 and the outer worm gear sleeve 52 is desirable to cause translation of the ball stud 20, except when the rotational force applied to the head portion 46 exceeds a desired limit, with the limit being less than an applied rotational force that could damage one or more components of the adjuster 10. For example, where the components coupled to the ball stud 20, or the ball stud 20 itself, have reached a mechanical limit, such that continued applied rotational force would cause undesirable mechanical slippage/stripping/damage to occur to components between the outer worm gear sleeve 52 and the ball stud 20.

To prevent such potential damage the worm input drive 40 is clutchable. More particularly, when rotation of the inner drive sleeve 42 does not cause the desired rotation of the outer worm gear sleeve 52, such as due to binding of other components coupled to the outer worm gear sleeve 52, the engagement ribs 50 are pushed radially inward and if enough pressure is applied, will move out of their respective engagement grooves 56. The engagement ribs 50 are allowed to move radially inward due to the sleeve slots 48 that provide room for the shaft portion 44 to at least partially collapse under the engagement ribs 50. Continued applied rotational force in the same direction will result in continued clutching, preventing damage to adjuster components. Various shapes and sizes of sleeve slots 48, engagement ribs 50, and engagement grooves 56 can be utilized, with the shape, size, and/or material hardness determining the desired clutching force limits.

The worm input drive 40 has been shown with the tool engaging portion 62 in the head portion 46 of the inner drive sleeve 42, although in at least some embodiments, the inner drive sleeve 42 can be coupled to additional components (e.g., other rods, gears, extenders, etc.) to allow for an alternate, or additional, tool engaging portion that is displaced from and indirectly coupled to the inner drive sleeve 42.

Although the invention has been herein described in what is perceived to be the most practical and preferred embodiments, it is to be understood that the invention is not intended to be limited to the specific embodiments set forth above, but include modified forms of those embodiments including portions of the embodiments and combinations of elements of different embodiments as come within the scope of the following claims. Further, it is recognized that modifications may be made by one of skill in the art of the invention without departing from the spirit or intent of the invention and, therefore, the invention is to be taken as including all reasonable equivalents to the subject matter of the appended claims and the description of the invention herein. And, although certain advantages of different embodiments and disadvantages of certain prior art are described, no single claim must realize every or any benefit or overcome every or any disadvantage.

I claim:

1. A fine pitch adjuster comprising:
   a housing;
   a wheel gear positioned within the housing and coupled to a ball stud, wherein rotation of the wheel gear provides inward and outward longitudinal translation of the ball stud relative to the housing; and
   a clutching worm input drive comprising:
      an inner drive sleeve having a shaft portion and a head portion, the shaft portion including a plurality of sleeve slots formed therein and a plurality of engagement ribs extending longitudinally and radially therefrom; and
      an outer worm gear sleeve rotationally mounted at least partially in the housing and having worm gear threads extending radially therefrom, the worm gear threads coupled at least indirectly to the wheel gear, and an inner chamber for receiving the shaft portion therein, the outer worm gear sleeve including a plurality of grooves extending longitudinally along the inner chamber for mating engagement with the plurality of engagement ribs, wherein rotation of the inner drive sleeve provides clutchable engagement with the outer worm gear sleeve to rotate the wheel gear.

2. The fine pitch adjuster of claim 1, wherein clutching of the clutchable engagement includes the plurality of engagement ribs moving radially inward by the partial collapse of the shaft portion of the inner drive sleeve.

3. The fine pitch adjuster of claim 2, wherein the head portion of the inner drive sleeve includes a tool engaging portion for receiving a tool to apply rotational force to the inner drive sleeve.

4. The fine pitch adjuster of claim 3, wherein the outer worm gear sleeve further includes a top flange portion and a bottom flange portion, and wherein the top flange portion and the bottom flange portion are situated outside of the housing to rotatably secure the outer worm gear sleeve relative to the housing.

5. The fine pitch adjuster of claim 2, wherein the wheel gear includes a cylindrical body with gear teeth extending radially therearound a portion thereof for engagement with the worm gear threads.

6. The fine pitch adjuster of claim 5, wherein the wheel gear includes one or more internal guide ribs.

7. The fine pitch adjuster of claim 6, wherein the ball stud includes a threaded portion and a head portion, and wherein the threaded portion further includes one or more longitudinally extending grooves slidingly engaged with the internal guide ribs of the wheel gear.

8. The fine pitch adjuster of claim 7, wherein the housing includes a threaded nose engaged with the threaded portion of the ball stud, wherein rotation of the ball stud provides longitudinal translation relative to the housing.

9. The fine pitch adjuster of claim 8, wherein the housing includes a front portion secured to a rear portion.

10. A clutching worm input drive comprising:
    an inner drive sleeve having a shaft portion and a head portion, the shaft portion including a plurality of sleeve slots formed therein and a plurality of engagement ribs extending longitudinally and radially therefrom; and
    an outer worm gear sleeve having worm gear threads extending radially therefrom and coupled at least indirectly to the wheel gear, and an inner chamber for receiving the shaft portion therein, the outer worm gear sleeve including a plurality of grooves extending longitudinally along the inner chamber for mating engagement with the engagement ribs.

11. The clutching worm input drive of claim 10, wherein the inner drive sleeve is in clutchable engagement with the outer worm gear sleeve.

12. The clutching worm input drive of claim 11, wherein the plurality of engagement ribs are movable radially inward by a partial collapse of the shaft portion of the inner drive sleeve to provide clutching between the inner drive sleeve and the outer worm gear sleeve.

13. The clutching worm input drive of claim 12, wherein the head portion of the inner drive sleeve includes a tool engaging portion for receiving a tool to apply rotational force to the inner drive sleeve.

14. The clutching worm input drive of claim 13, wherein the outer worm gear sleeve further includes a top flange portion and a bottom flange portion.

15. The clutching worm input drive of claim 14, wherein the outer worm gear sleeve is rotatably mountable at least partially in a housing, and wherein the top flange portion and the bottom flange portion are situated outside of the housing to rotatably secure the outer worm gear sleeve relative to the housing.

16. The clutching worm input drive of claim 15, wherein the worm gear threads of the outer worm gear sleeve are engageable with a wheel gear situated in the housing.

17. The clutching worm input drive of claim 16, wherein the wheel gear is at least indirectly coupled with a ball stud that is at least partially situated in the housing, and wherein rotation of the wheel gear via the outer worm gear sleeve provides translation of the ball stud longitudinally from and to the housing.

\* \* \* \* \*